(12) United States Patent
Costill

(10) Patent No.: X6996
(45) Date of Patent: Apr. 13, 1832

(54) VALVE, FACE PLATE

(76) Inventor: Stacy Costill

Stacy Costill
Letters Patent

The Schedule referred to in these Letters Patent and making part of
the same containing a description in the words of the said Stacy Costill
himself of his improvement called the face plate valve This valve is formed by putting together two plates with cavities and is in
tended to suit purposes where ordinary valves are applied. It is made of
Iron or other metals with faces made to fit so that the fluid will not
pass between them except by the cavities coming in contact with each other
and that is done by changing the position of the faces of the plates in such
a manner as to bring the cavities in contact at the pleasure of the operator.
There may be one or more cavities to admit and eject the fluids.
And the valve by a rotary motion may be used as a pump to a Steam
Boiler and for other purposes — The plates are held to their fa
ces against the pressure of fluids intended to pass by screw or other
mechanical power. By changing the plates to another position
so that the cavities are not in contact the fluid is confined act
ing like an ordinary valve and admitting as much or as little fluid
as is required — This is performed by the motion of the plates moving
on their faces. the valve can be applied to Cocks &c &c Witnesses
James P. Bailey
Wm C. Chester Stacy Costill Ex^d.
Ch.C.W.

260 [illegible]